Feb. 17, 1942. J. H. SMITH 2,273,228
RETRACTABLE BORING TOOL
Filed Dec. 28, 1939 2 Sheets-Sheet 1

INVENTOR.
J. HUGO SMITH
BY
Barnes, Kisselle, Laughlin & Keuch
ATTORNEYS

INVENTOR.
J. Hugo Smith

Patented Feb. 17, 1942

2,273,228

UNITED STATES PATENT OFFICE 2,273,228

RETRACTABLE BORING TOOL

J. Hugo Smith, Detroit, Mich., assignor to Wesson Company, Detroit, Mich., a corporation of Michigan Application December 28, 1939, Serial No. 311,264

12 Claims. (Cl. 77—58)

This invention relates to boring tools and has particularly to do with the type of tool in which the cutting means is retractable in the tool holder.

Many attempts have been made to design a retractable type tool which will permit the boring or reaming of a hole during the inward stroke and the retraction of the cutting means within the tool prior to the withdrawal of the tool from the bore. It is an object of the present invention to provide a retractable tool in which there is a positive movement of the cutting means in and out of the tool holder and a convenient and accurate means for adjusting the movement of the cutting means.

A further object is to provide a construction in which the tools are locked in operative position in such a manner that radial inward forces thereon are ineffective to shift their position.

Other objects having to do with various features of the construction and operation, including the manner of mounting the cutting means in the tool holders, will be brought out in the following description and claims.

Figures 1, 2, 3, 4:
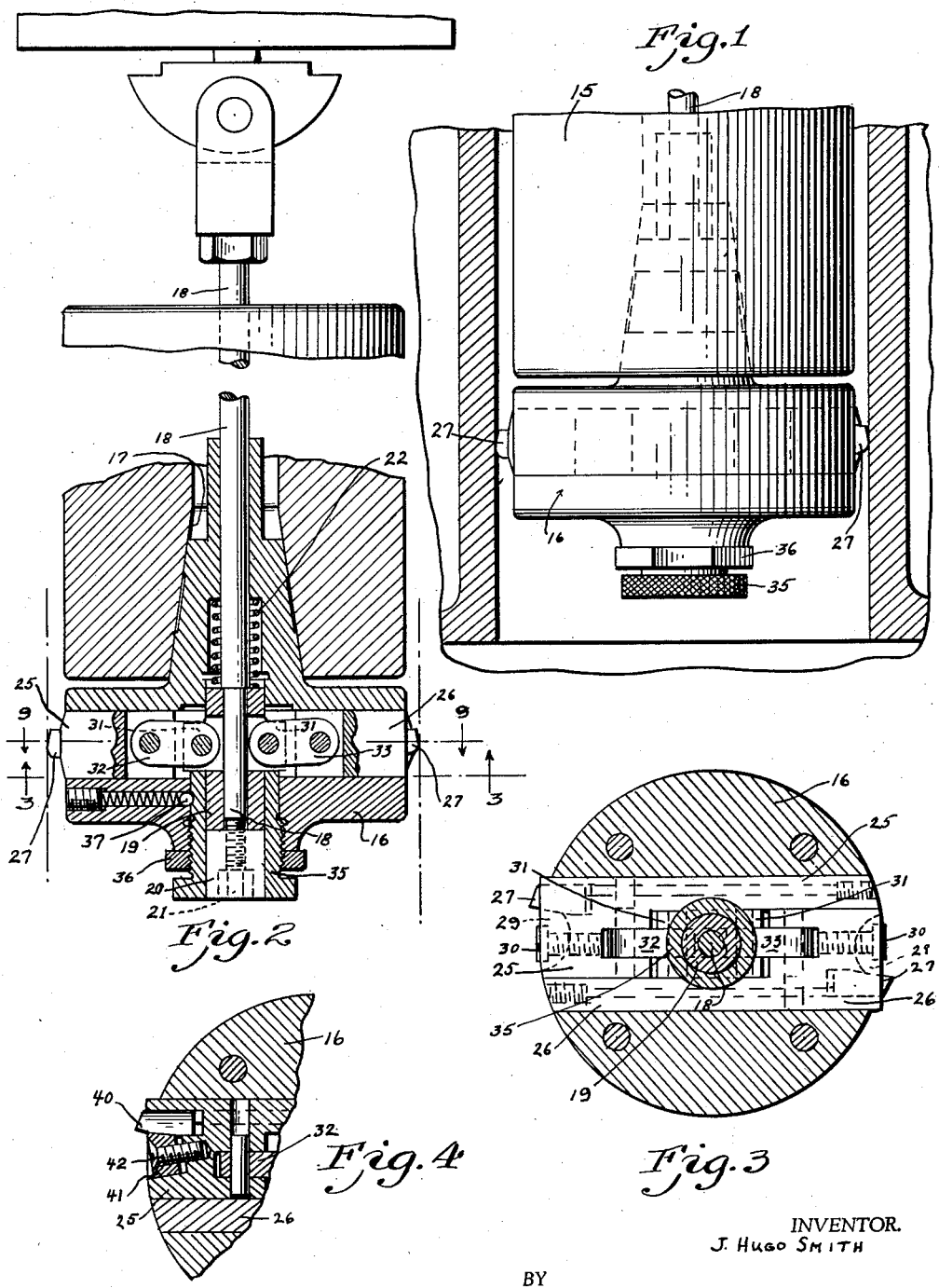
Fig. 1 illustrates the assembly in boring position within a work piece.
Fig. 2 is a vertical cross section showing the various elements of the assembly.
Fig. 3 is a transverse section taken on the lines 3—3 of Fig. 2.
Fig. 4 is an illustration of a modified manner of holding the cutting means within the tool holders.

A revolvable tool chuck 15 holds a tool member 16 by reason of a tapered socket 17. A solenoid-controlled, adjustable-length, pull rod 18 passes axially down through the chuck and tool member. An axial recess is provided in the tool member in the lower end thereof having a diameter greater than the pull rod 18 and slidable within this recess is a plunger 19 held on the pull rod 18 by a threaded plug 20 having a socket 21. A spring 22 urges the plunger to its downward position. In the tool member 16 is a transverse diametrical opening having a square cross section. Within this opening are two L-shaped tool holders 25 and 26. The back of each of the L pieces is slidable at the sides of the opening and the base of each L slides on the back of the other so that there is an overlapping slidable relation between the tool holders. The base of each L piece is provided with a recess holding a tool 27 and an adjustable rod 28 passes through the back of each L to adjust the position of the tool cutters 27 within their recesses. A woodruff key-shaped piece 29 holds the tool cutters 27 in place by reason of a screw 30. The plunger 19 is provided with two transverse opposed extensions 31, each having a central slot in which are pivoted respectively, links 32 and 33. These links extend transversely of the tool and are each pivotally connected, respectively, in slots in tool holders 25 and 26.

Figure 6:
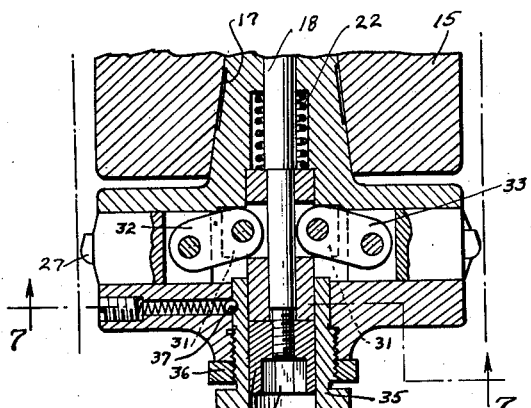
Fig. 6 is a partial view of the elements shown in Fig. 2 showing some of the parts in different relative positions.
Figure 5:
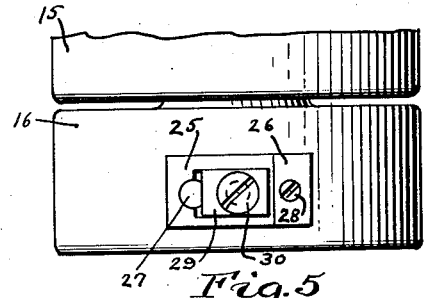
Fig. 5 is a side elevation of a tool member illustrating the manner in which the cutting means is held in place.
Figure 7:
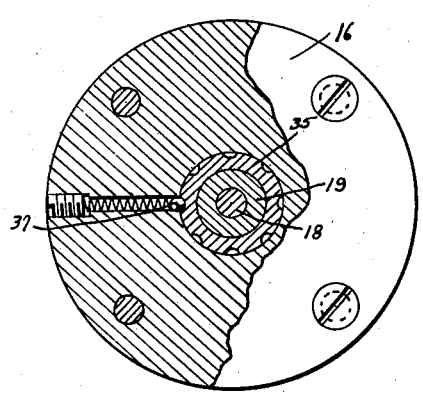
Fig. 7 is a partial section taken on the lines 7—7 of Fig. 6.

Surrounding the lower end of the plunger 19 and the plug 20 is a sleeve 35 threaded in the base of the tool member 16. A lock collar 36 holds this sleeve in locked position. When the lock collar is loosened, the sleeve may be adjusted longitudinally of the tool member and a spring pressed ball 37 is arranged to set partially within recesses in the outer wall of the sleeve 35 to indicate relative movement thereof. The sleeve 35 is to serve as a stop for the movement of the plunger 19; it contacts the transverse extensions 31 on the plunger and prevents the downward movement as the assembly is viewed in Fig. 2. In the extreme lower position, as shown in Fig. 2, the links 32 and 33 are in an over-center position. The parts are in operating position, and it will be seen that the cutters 27 contact the vertical dot-dash lines to indicate that the tools are in cutting position. Inward movement on the cutters would simply tend to urge the plunger 19 against the sleeve 35 and lock it more firmly in position. When the tool has passed downwardly through the work piece, as viewed in Fig. 1, the pull rod 18 may be lifted relative to the tool by a solenoid, not shown, or other suitable means, so that the plunger 19 will be shifted upwardly to the position shown in Fig. 6. Because of the links 32 and 33, the tool holders 25 and 26 will be retracted so that the cutters 27 assume an inward position, as shown by the space between the end of the cutters and the dot-dash lines. The assembly may then be withdrawn from the bore and will not scratch or mar the same. Because of the positive connection between the adjusting plunger and the tool holders, it will be seen that there is a positive movement of the tool holders of the cutter outwardly and inwardly.

Figure 8:
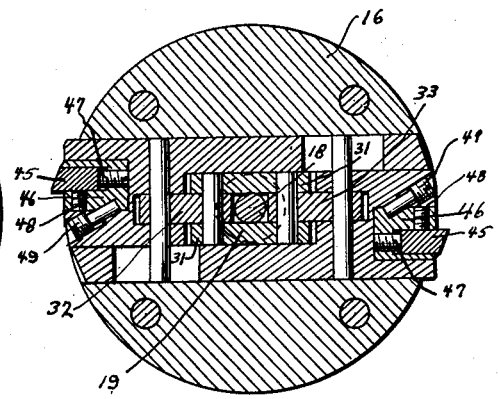
Fig. 8 is a transverse section of a tool showing a modified manner of holding the cutters within the tool holders.
Figure 9:
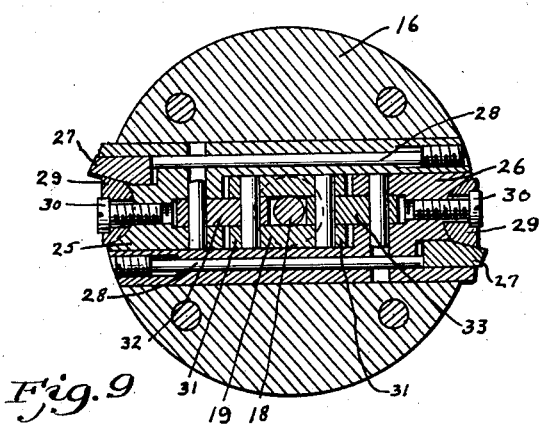
Fig. 9 is a transverse section taken on the lines 9—9 of Fig. 2.

Means, other than that shown in Figs. 2, 3 and 9, may be used for holding the cutters in position. For example, in Fig. 4, a cutter 40 is held in position by a part-cylindrical piece 41 and a screw 42 passing therethrough. The part-cylindrical piece is provided with a tapered side which cooperates with a bevel on the cutter 40 to wedge the same in place. In Fig. 8, cutters 45 are shown mounted in plugs 46, the relative position in the plugs being controlled by set screws 47 at the base of the plugs and set screws 48 at the sides. The entire plug is then held in the tool holder by a screw 49 set at an angle in the holder.

It is within the contemplation of this invention that more than two cutters may be used. For large diameter boring, a plurality of cutters may be spaced around a boring head and each connected by a link 32 to a ring flange on a plunger comparable to 19.

I claim:

1. In a boring head of the retractable tool type, a tool member having one or more radial openings, a tool holder in each of said openings provided with a tool which projects beyond the tool member, a plunger mounted axially of said tool member, a link connecting said plunger and each of said tool members whereby axial shifting of said plunger will cause radial movement of said tool holders and an adjustable means arranged to limit the movement of said plunger in one direction whereby when said plunger is moved to its extreme position in said direction, the tools and said tool holders will be located at a predetermined position relative to the center of said tool member and radial forces inwardly on said tools will tend to force said plunger against said adjustable means.

2. In a boring head of the retractable tool type, a cylindrical tool member, a diametrical opening through said tool member, tool holders projecting outwardly from each end of said diametrical opening and arranged to overlap throughout said opening, said tool holders being slidably positioned within said opening, an axially extending shaft within sad tool member arranged to pass between said tool holders, links extending radially from said shaft pivotally connected thereto and pivotally connected at the outer ends to said tool holders whereby axial movement of said shaft will cause radial movement of said tool holders, and means for limiting the movement of said shaft in one direction whereby when said shaft is moved to its extreme position in said direction, said links will be so arranged that radial inward forces on said tool holders will tend to move said shaft toward said means.

3. In a boring head of the retractable tool type, a tool body, one or more radial openings in said body, an axially extending hole formed in said body, a plunger slidably fitted in said hole, a tool holder in each of said radial openings, and link members pivotally connecting each of said holders and said plunger whereby said holders may be positively moved in and out with respect to said body by shifting said plunger.

4. In a boring head of the retractable tool type, a tool member having a plurality of radial openings, a tool holder in each of said radial openings, a hole formed in said body extending axially thereof, a plunger slidably fitted in said axial hole, link means connecting said plunger and each of said tool holders whereby axial shifting of said plunger will cause radial movement of said tool holders, and a limit means for the axial shifting of said plunger in one direction whereby when said plunger is moved to its extreme position in said direction, the link means will be over dead center and inward radial forces on said tool holders will force said plunger against said limit means.

5. In a boring head of the retractable tool type, a tool body, an axially extending hole formed therein, a plunger slidably fitted in said hole, a diametric passage through said body intersecting said hole, opposed tool holders slidably positioned within said passage, cutting tools on opposite ends of said tool holders, and links pivoted on each side of said plunger extending to and pivoted on said tool holders whereby said tools may be positively moved in and out with respect to said body by shifting said plunger.

6. In a boring head of the retractable tool type, a tool body, an axially extending hole formed therein, a plunger slidably fitted in said hole, radial passages in said body intersecting said axial hole, tool holders slidably positioned within sad passages, cutting tools on outer ends of said tool holders, links pivoted on said plunger extending to and pivoted on said tool holders whereby said tools may be positively moved in and out with respect to said body by shifting said plunger, and a stop collar surrounding one end of said plunger adapted to serve as a bearing therefor, and as a means for limiting movement of said plunger in one direction to control the outer position of said tools.

7. In a boring head of the retractable tool type, a tool body, an axially extending hole formed therein, a plunger slidably fitted in said hole, a diametric passage through said body intersecting said axial hole, opposed tool holders slidably positioned within said passage, cutting tools on opposite ends of said tool holders, links pivoted on each side of said plunger extending to and pivoted on said tool holders whereby said tools may be positively moved in and out with respect to said body by shifting said plunger, and a stop means at one end of said plunger arranged to limit the movement of said plunger in one direction to such a position that said links will be over center and radial inward forces on said tools will be ineffective to change the position thereof.

8. In a boring head of the retractable tool type, a tool body, an axially extending hole formed therein, a plunger slidably fitted in said hole, a diametric passage through said body intersecting said axial hole, opposed tool holders slidably positioned within said passage, cutting tools on opposite ends of said tool holders, links pivoted on each side of said plunger extending to and pivoted on said tool holders whereby said tools may be positively moved in and out with respect to said body by shifting said plunger, and a stop means at one end of said plunger arranged to limit the movement of said plunger in one direction to such a position that said links will be over center and radial inward forces on said tools will be ineffective to change the position thereof, said stop means comprising a collar serving as a bearing for said plunger and threaded in said body whereby the final cutting position of said tools may be controlled.

9. In a boring head of the retractable tool type, a tool member, a transverse opening therethrough, two tool holders in said opening, each comprising an L-shaped piece having its back in slidable contact with a side of said opening and the base to an end of the opening, the inwardly disposed face of each L piece being in slidable contact with the inwardly disposed face of the other L piece, a tool in the corner of each L piece arranged to be moved in and out of the opening by movement of the L piece in which it is mounted, and means located in said tool member and operable from without the tool for simultaneously shifting said tool holders in and out of said member.

10. In a boring head of the retractable tool type, a tool member, a transverse opening therethrough, two simultaneously adjustable tool holders in said opening, each comprising an L-shaped piece having its back in slidable contact with a side of said opening and the base to an end of the opening, the inwardly disposed face of each L-piece being in slidable contact with the inwardly disposed face of the other L piece, a tool recess formed in the base of each L piece, a tool in said recess, and means extending longitudinally through the back of each L piece arranged to contact said tool to adjust the position thereof, said means being adjustable from the top of each L piece, and means in the base of each L piece for locking said tool in position.

11. In a boring head of the retractable tool type, a tool member, a transverse opening therethrough, two simultaneously adjustable tool holders in said opening, each comprising an L-shaped piece having its back in slidable contact with a side of said opening and the base to an end of the opening, the inwardly disposed face of each L piece being in slidable contact with the inwardly disposed face of the other L piece, a tool recess formed in the base of each L piece, a tool in said recess, and means available from without the boring head for adjustably locking said tool in said recess comprising a wedge member having a curved surface, a portion of which is beveled, a screw passing through said wedge member and threaded into said L-piece, said tool and said wedge member having contacting surfaces adapted to wedge said tool in position.

12. In a boring head of the retractable tool type, a tool member, a transverse opening therethrough, two tool holders in said opening, each comprising an L-shaped piece having its back to a side of said opening and the base to an end of the opening, the inwardly disposed face of each L piece being in slidable contact with the inwardly disposed face of the other L piece, a tool recess formed in the base of each L piece, a tool in said recess, and means for moving said tools in and out of said tool member comprising an axially extending plunger within said tool member adjustable therein, and links connected pivotally to said plunger and to each of said L pieces respectively, whereby shifting of said plunger causes radial shifting of said tool holders.

J. HUGO SMITH.